United States Patent Office 3,004,095
Patented Oct. 10, 1961

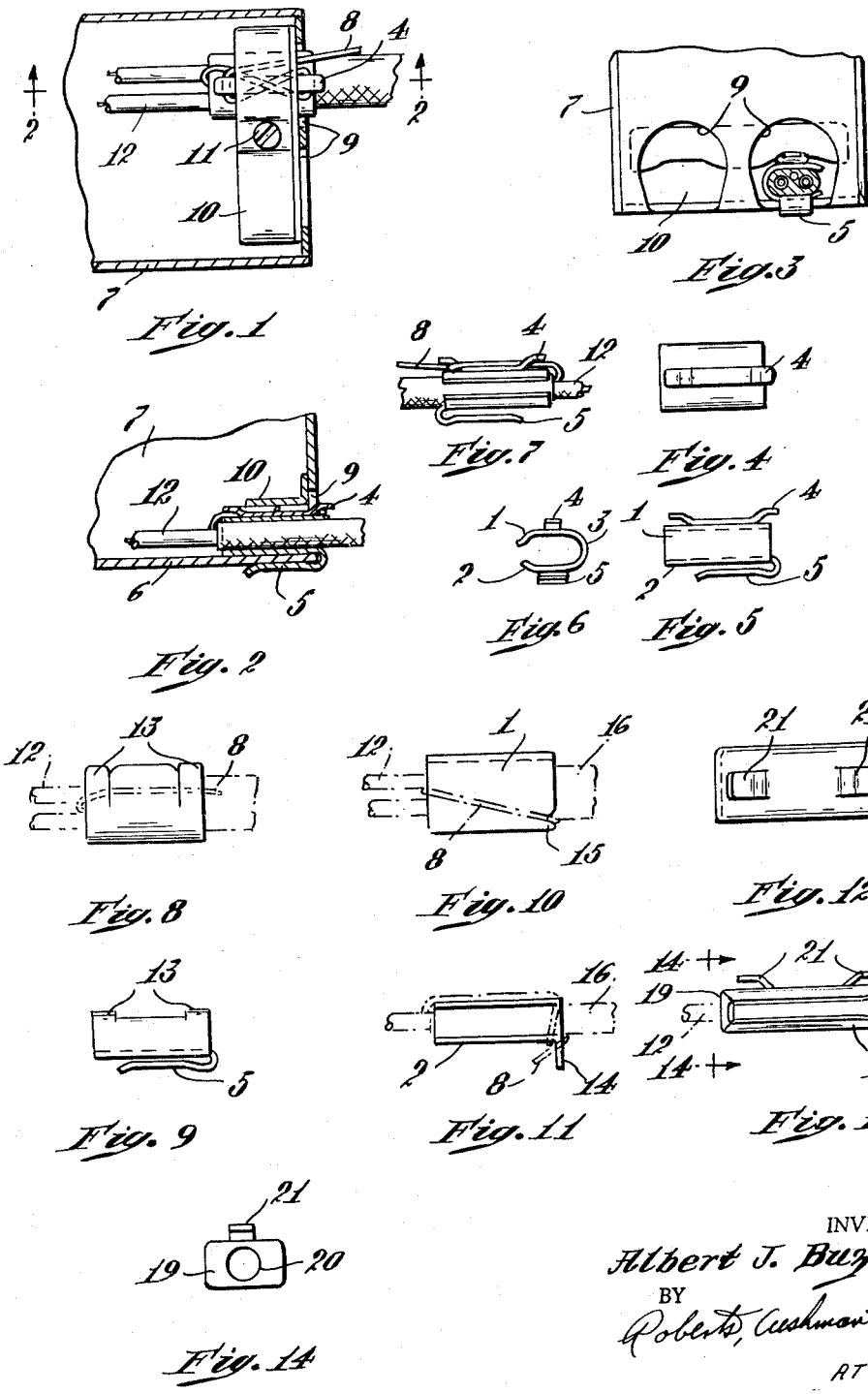

3,004,095
GROUNDING CLIP
Albert J. Buzak, Marblehead, Mass., assignor to The Thomas & Betts Co., Elizabeth, N.J., a corporation of New Jersey
Filed July 2, 1959, Ser. No. 824,638
2 Claims. (Cl. 174—51)

In electric power distribution systems using a metal conduit surrounding the conductors the connection between the cable and the metal junction box is made simply as the conduit is clamped to the junction box. However in using cables with a non-metallic sheath it is common practice in the industry to include within the sheath a ground wire having no independent insulation of its own. Heretofore the practice in establishing a connection between the ground wire and the metal junction box was to clamp the wire in a screw-type binding post attached to the junction box or to wind the ground wire around the sheathing at the point where the cable enters the junction box and then to clamp this winding as would be done in the case of a metal conduit, thereby making both a mechanical and an electrical connection.

The chief disadvantage of the first method is that, while providing a good ground, it tends to be both time consuming and awkward, the work often having to be done on the inside of the junction box. The disadvantages of the latter method are that it also is time consuming and further that, when the winding is clamped in the junction box, a turn of the comparatively thin wire may be driven through the insulation of the cable thus shorting the conductors. Further problems in clamping cables to the junction box are that occasionally the cable will slide too far into the junction box before it is clamped or when two cables are to be held by one clamp there is difficulty in keeping the one in place while preparing the other or in holding the two in place while tightening the clamp.

An object of the present invention is to provide a means for establishing a ground connection between a standard junction box and a non-metallic sheathed cable which is as simple in use as that for grounding metal conduit and which utilizes the same standard fittings.

Further objects are to provide a means for establishing such a ground connection which is inexpensive and easy to manufacture, which may be applied quickly and without the use of tools, which requires no additional fittings on the junction box and which prevents the possibility of shorting the conductors when clamping the cable in the junction box.

Still further objects are to provide means for limiting the extent to which the cable may be inserted into the junction box and to provide means for fastening the cable to the junction box before clamping.

According to the present invention the sheathing is stripped back a short distance from the end of the cable as is the usual practice in the trade, a metal clip is placed over the end of the remaining sheathing, and the ground wire is secured thereto. The cable and clip may then be inserted into the junction box and clamped therein in the usual fashion thus making both an electrical and a mechanical connection.

The ground wire may be secured to the clip, for example, by a cleat attached to the clip, by a pair of tabs struck up from the material of the clip in the fashion of a cleat, or by an ear projecting outwardly from one end of the clip.

The clip may also include an integral tab projecting outwardly from one end of the clip to limit the extent to which the cable may be inserted into the junction box and said tab may be bent over to form a secondary clip to snap over the edge of the junction box.

Furthermore the same tab which serves to limit the travel of the cable into the box may also serve to secure the ground wire. In this case it has been advantageous to place a notch in the clip on the side opposite the tab to hold the ground wire in position (FIG. 10).

The present invention also contemplates an elongated clip with an opening in the end thereof for the cable, the clip being attached to the cable by passing the exposed conductors of the cable through the opening until the clip grasps the end of the remaining sheathing.

For the purpose of illustration typical embodiments are shown in the accompanying drawing in which:

FIG. 1 is a fragmentary plan view of a junction box showing a cable and grounding clip according to the present invention clamped therein;

FIG. 2 is a longitudinal section on the line 2—2 of FIG. 1;

FIG. 3 is a fragmentary end view of the junction box shown in FIG. 1;

FIG. 4 is a plan view of the grounding clip shown in FIGS. 1 to 3;

FIG. 5 is a side elevation of the grounding clip;

FIG. 6 is an end view of the grounding clip;

FIG. 7 is a side elevation of the grounding clip attached to a cable;

FIG. 8 is a plan view of a modification;

FIG. 9 is a side elevation of the modification shown in FIG. 8;

FIG. 10 is a plan view of another modification;

FIG. 11 is a side elevation of the modification shown in FIG. 10;

FIG. 12 is a plan view of another embodiment of the present invention;

FIG. 13 is a side elevation of the embodiment shown in FIG. 12; and

FIG. 14 is an end view of the embodiment shown in FIG. 12.

Referring now to the drawings and particularly to the illustrative embodiment shown in FIGS. 1 to 7, the grounding clip comprises a piece of resilient sheet metal bent to form a top part 1 and a bottom part 2, and one side part 3. A cleat 4 is rigidly attached to the top part 1. The bottom part 2 is extended beyond the top and side parts at one end. This extended portion is bent under the rest of the bottom part so as to form a secondary clip 5 which will grasp the bottom 6 of the junction box 7 as shown in FIG. 2.

With the outer sheathing stripped back from the conductors 12 for a short distance, the clip is slipped over the cable at the point where the remaining sheathing ends and the ground wire 8 is secured to the clip by means of the cleat 4 as shown in FIG. 7. The clip and cable are then inserted into the junction box 7 through a knockout opening 9 until the secondary clip 5 engages the bottom 6 of the junction box (FIGS. 1, 2 and 3). The clamp 10 is then tightened down on the cable and clip by means of the screw 11 so as to establish both a mechanical and an electrical connection.

In the modification shown in FIGS. 8 and 9 the top part of the clip has been slit to form tabs 13. The ground wire 8 is then secured by being inserted between the tabs, said tabs being shaped so as to firmly grasp the ground wire.

FIGS. 10 and 11 depict a modification wherein a tab 14 projects outwardly from one end of the bottom part 2 of the grounding clip. The tab 14 serves both to secure the ground wire 8 and to limit the extent to which the clip may be inserted into the junction box. A notch 15 is cut into the top part of the clip to aid in positioning the ground wire.

FIGS. 12, 13 and 14 show another embodiment of the present invention consisting of a piece of resilient sheet metal bent so as to form a top part 17, a bottom part 18 and one end part 19. The end part has an opening 20 therethrough. A pair of tabs 21 are struck up from the top part 17 of the clip to serve as a cleat. With the cable sheathing stripped back a short distance, the conductors 12 may be passed through the opening 20 until the end of the remaining sheathing abuts the end 19 of the clip. The ground wire 8 is then secured to the tabs 21 and the clip and cable are ready to be clamped in a junction box.

It should be understood that the embodiments described in the present disclosure are for the purpose of illustration and that this invention includes all modifications and equivalents which fall within the scope of the appended claims.

I claim:

1. A grounding device for connecting the ground wire of a non-metallic sheathed cable to a metal outlet box having an adjustable clamp therein, comprising a resilient metal clip having a body portion of U-shape in cross section adapted to grip said cable, an extension integral with one end of one side of said body portion bent upon itself to frictionally receive an edge portion of an outlet box between said body portion and said extension upon inserting the opposite end portion of said body portion into said outlet box through a knock-out opening therein, and a cleat secured on the other side of said body portion lengthwise thereof for receiving turns of said ground wire thereon whereby said ground wire turns are clamped between said body portion and said cleat upon securing said adjustable clamp across said inserted body portion and on said cleat to secure said grounding device in said outlet box against relative movement.

2. A grounding device for connecting the ground wire of a non-metallic sheathed cable to a metal outlet box having a knock-out opening in its opposite end walls and an adjustable clamp therein adjacent each of said end walls, comprising a resilient sheet metal clip having a body portion of U-shape in cross section adapted to substantially encompass an end portion of said cable in gripping relation, a rectangular extension integral with one end of one wall of said body portion bent upon itself to frictionally receive an edge portion of said outlet box between said body portion and said bent extension upon inserting the opposite end portion of said body portion into said outlet box through one of said knock-out openings, and a pair of oppositely disposed tabs struck-out of the plane of the opposite wall of said body portion lengthwise thereof forming a cleat for wrapping an end portion of said ground wire thereon whereby said ground wire end portion is clamped between said body portion and said cleat upon securing one of said adjustable clamps across said inserted body portion and on said cleat to secure said grounding device in said outlet box against relative movement.

References Cited in the file of this patent

UNITED STATES PATENTS

| | | |
|---|---|---|
| 1,255,310 | Henderson | Feb. 5, 1918 |
| 1,860,829 | Abbott | May 31, 1932 |
| 2,523,185 | Bedford | Sept. 19, 1950 |
| 2,864,161 | Curtiss | Dec. 16, 1958 |